(12) United States Patent
Kanamori

(10) Patent No.: US 9,119,406 B2
(45) Date of Patent: Sep. 1, 2015

(54) TEXTURE-IMPROVING AGENT FOR A STARCH PROCESSED FOOD

(75) Inventor: Jiro Kanamori, Ibaraki (JP)

(73) Assignee: FUJI OIL COMPANY LIMITED, Osaka (JP)

( * ) Notice: Subject to any disclaimer, the term of this patent is extended or adjusted under 35 U.S.C. 154(b) by 0 days.

(21) Appl. No.: 14/004,719

(22) PCT Filed: Mar. 21, 2012

(86) PCT No.: PCT/JP2012/057100
§ 371 (c)(1),
(2), (4) Date: Sep. 12, 2013

(87) PCT Pub. No.: WO2012/133012
PCT Pub. Date: Oct. 4, 2012

(65) Prior Publication Data
US 2014/0004247 A1 Jan. 2, 2014

(30) Foreign Application Priority Data
Mar. 29, 2011 (JP) ................................ 2011-072341

(51) Int. Cl.
A23J 3/16 (2006.01)
A21D 2/26 (2006.01)
A23L 1/305 (2006.01)
A23L 1/10 (2006.01)
A23L 1/16 (2006.01)
A23J 1/14 (2006.01)

(52) U.S. Cl.
CPC . *A23J 3/16* (2013.01); *A21D 2/266* (2013.01); *A23J 1/14* (2013.01); *A23L 1/1008* (2013.01); *A23L 1/16* (2013.01); *A23L 1/3055* (2013.01)

(58) Field of Classification Search
CPC ....... A23L 1/16; A23L 1/2006; A23L 1/0562; A23L 1/20; A23L 1/31427; A23L 2/66; A23J 3/16; A21D 2/266; A23V 2250/5488
USPC ......... 426/656, 634, 549, 550, 552, 555, 556, 426/557, 558, 559, 560
See application file for complete search history.

(56) References Cited

U.S. PATENT DOCUMENTS

| | | | |
|---|---|---|---|
| 2008/0008815 A1* | 1/2008 | Cho | 426/634 |
| 2010/0028520 A1* | 2/2010 | Kanamori et al. | 426/557 |
| 2010/0196575 A1* | 8/2010 | Sanchez et al. | 426/578 |

FOREIGN PATENT DOCUMENTS

| | | | |
|---|---|---|---|
| JP | 10-108616 | | 4/1998 |
| JP | 2002-65194 | | 3/2002 |
| JP | 2002-165552 | | 6/2002 |
| JP | 2003-38089 | | 2/2003 |
| WO | WO 2008/072656 | * | 6/2008 |

OTHER PUBLICATIONS

Matcha Japan Travel Web Magazine. Mar. 2013. http://mcha-jp.com/1017.*
Japanese Cooking 101. "Ramen Recipe". 2014 http://www.japanesecooking101.com/ramen-recipe/.*
Yakisoba—Japanese Stir-Fried Noodles. 2012. http://www.ibelieve-icanfry.com/2012/04/yakisoba-japanese-stir-fried-noodles.html.*
English Translation for JP 2002-165552. Published Jun. 2002.*
English Translation for JP 10-108616. Published Apr. 1998.*
English Translation for JP 2002-065194. Published Mar. 2002.*
English Translation for JP 2003-038089. Published Feb. 2003.*
International Search Report issued Jun. 12, 2012 in International (PCT) Application No. PCT/JP2012/057100.
English translation of the International Preliminary Examination Report on Patentability and Written Opinion dated Oct. 2, 2013.

* cited by examiner

*Primary Examiner* — Anthony Weier
(74) *Attorney, Agent, or Firm* — Wenderoth, Lind & Ponack, L.L.P.

(57) ABSTRACT

Provided is a texture-improving agent for a starch processed food, which exhibits an effect of improving texture by being added to a starch processed food. By using a physical property-improving agent containing, as an active ingredient, a separated soybean protein composition obtained by drying in the form of an acid precipitate, a starch processed food having improved physical properties can be obtained. More specifically, the agent has an effect of improving physical properties and texture, for example, enhancing physical strength such as chewiness and elasticity, improving crispness and stickiness, and so on, and also has an effect of maintaining the improved properties and texture.

9 Claims, No Drawings

TEXTURE-IMPROVING AGENT FOR A STARCH PROCESSED FOOD

TECHNICAL FIELD

The present invention relates to a soybean protein isolate composition suitable for use for improving a physical property of a processed starch food.

BACKGROUND ART

A processed starch food is eaten all over the world in various forms such as breads, noodles, rice cakes and confectioneries regardless of principal food or side dish. Various techniques for improving a texture of the processed starch food are designed in order to further enhance a palatability of the processed starch food. For example, softening of breads, prevention of dried out due to aging, addition of firmness (elasticity) to noodles, improvement of stickiness, improvement of chewiness, and the like are reported.

Various techniques for improving a quality of the processed starch food by adding soybean protein are designed. Patent document 1 describes an improvement of bread, sponge cake, steamed bread and rusk. Patent document 2 describes a method for improving deep fry batter. However, these effects are narrow and more improvement has been desired.

Generally, soybean protein is used as a soybean protein powder obtained by pulverizing a soybean protein raw material such as whole soybean and defatted soybean, or a water extract obtained by extracting with water or warm water and then removing fiber. The water extract is often subjected to further treatment and used as a soybean protein isolate. For example, the water extract is subjected to an isoelectric point precipitation at pH about 4 to 5, and the precipitated protein is separated and recovered, and water is added to the precipitate, and the precipitate is re-dissolved by neutralizing to pH about 7 to 8 with alkaline agent such as sodium hydroxide. And thereby, soybean protein is concentrated to obtain soybean protein isolate. In general, soybean protein has high function and is insusceptible to inhibitory effect by another component when the protein content is high. However, a lot of complex processes are necessary for the separation and refinement. In addition, it has problems in respect of the negative environmental impact and the cost of manufacturing, for example, large quantity of water is used. Therefore, separation and refinement technology having a little process as much as possible has been required.

PRIOR ART DOCUMENTS

Patent Documents

Patent Document 1: JP 2003-38089 A
Patent Document 2: JP 2002-65194 A

DISCLOSURE OF INVENTION

Problems to be Solved by the Invention

An object of the present invention is to provide an environmentally-friendly and inexpensive soybean protein isolate composition suitable for use for improving a physical property of a processed starch food.

Means for Solving the Problems

The present inventors have intensively studied in order to solve the problems. As a result, the present inventors have found out that more preferable texture and physical property of a processed starch food can be obtained by extracting soybean protein with water from defatted soybean, and then subjecting the soybean protein to an isoelectric point precipitation and then drying the precipitate without neutralization to obtain soybean protein isolate and by kneading the soybean protein isolate into a processed starch food. The processed starch food obtained in this manner has better texture and physical property than the case of adding a soybean protein isolate obtained by drying after neutralization. The present invention has been completed on the basis of these findings.

That is, the present invention relates to:

(1) An agent for improving a physical property of a processed starch food, comprising a soybean protein isolate, which is obtained by drying in a condition of an acidic precipitate, as an active ingredient; and (2) A processed starch food comprising the agent for improving a physical property according to (1).

Effect of the Invention

According to the present invention, a processed starch food having improved physical property can be obtained. More specifically, the present invention provides an effect of improving the texture, for example, an effect of enhancing physical strength such as chewiness and elasticity, and an effect of improving a physical property such as ease of bite and stickiness, and an effect of continuing these effects.

MODE FOR CARRYING OUT THE INVENTION

Hereinafter, the present invention will be explained in detail. The present invention relates to an agent for improving a physical property of a processed starch food, comprising a soybean protein isolate, which is obtained by drying in a condition of an acidic precipitate, as an active ingredient.

(Soybean Protein Isolate Composition)

A soybean protein isolate composition of the present invention is a composition including soybean protein as a major ingredient and is obtained by extracting soybean protein with water or hot water from soybean raw material such as defatted soybean, and then removing fiber, and then subjecting the soybean protein to an acidic precipitation at pH about 4 to 5, around an isoelectric point of soybean protein, and then separating and recovering the precipitated protein.

An extraction condition such as pH, temperature, amount of extracting water, stirring intensity and separation method and an condition of treatment for improving concentration, pasteurization, drying, physical property etc. are not particularly limited if a necessary amount of the soybean protein can be obtained. These conditions can be adjusted in order to obtain a soybean protein isolate composition having high purity of protein. In addition, soybean protein can be partially hydrolyzed with enzyme after the extraction. Further, well-known fractionation treatment can be carried out to a raw material such as soybean, and the obtained β-conglycinin and glycinin can be used as a soybean protein isolate composition.

(Soybean Protein Isolate Obtained by Drying in a Condition of an Acidic Precipitate)

In a general manner, a soybean protein isolate composition in a condition of an acidic precipitate is neutralized to neutral or weak alkaline condition by adding water and alkaline agent in order to make the protein soluble, and then dried. On the other hand, in the present invention, a soybean protein isolate composition in a condition of an acidic precipitate is dried as it is or after dispersing with a small amount of water, at around an isoelectric point of soybean protein, for example, pH 4 to 5, and then preferably pulverized. Higher effect of improving a physical property of a processed starch food can be obtained by drying in a condition of an acidic precipitate. A spray drying is most preferable in the point of cost and physical property, but a freeze drying, a drum drying, a drying under reduced pressure, a hot air drying, a superheated steam drying, and the like can be used as drying. It is advantageous from a hygiene standpoint to carry out a pasteurization treatment with heating before or after drying. In addition, higher effect can be obtained by carrying out a pulverization treatment before or after drying.

As for a composition of the soybean protein isolate powder obtained in such a manner, a content of protein measured by Kjeldahl method with 6.25 of conversion coefficient is preferably 60% by weight or more in a dry matter of the soybean protein isolate composition, more preferably 80% by weight or more. When it is less than 60% by weight, improving effect may be low and the purpose may not be accomplished. A content of fiber measured by modified Prosky method is preferably 15% by weight or less in a dry matter of the soybean protein isolate composition, more preferably 10% by weight or less. When it is more than 15% by weight, inhibitory effect of fiber may be high and the purpose may not be accomplished.

Soybean protein isolate obtained by drying in a condition of an acidic precipitate of the present invention is hardly dissolved when water is added, and the dispersion shows a weak acidic, pH 4 to 5. In addition, it becomes water soluble by adjusting pH to neutral or alkaline, pH 7 or more, because it is soybean protein isolate. Dissolubility can be measured by adjusting to a prescribed pH by HCl or NaOH based on the measurement method of NSI (AOCS official method Ba 11-65). NSI is 30% or less, preferably 15% or less at weak acidic condition, pH 4.5. NSI is 60% or more, preferably 80% or more at neutral pH, pH 7.0.

(Processed Starch Food)

A processed starch food refers to all aspects of food including starch as major ingredient, for example, bakery product such as breads, cakes and confectioneries, noodles such as noodle and dumpling skin, and batter such as deep fry batter and bread crumb. Especially, the food in which major starch source is flour is preferable, and the food in which starch source is flour only is most preferable.

The effect of improving a physical property of a processed starch food includes an improvement of a texture, for example, an effect of enhancing physical strength such as chewiness and elasticity, and an effect of improving a physical property such as ease of bite and stickiness. In addition, an effect of continuing these effects is also included.

Method of adding a soybean protein isolate composition to a processed starch food is not particularly limited if these can be mixed uniformly after the adding. For example, mixing the soybean protein isolate composition to raw material of the processed starch food in a powder state after powdering the soybean protein isolate composition is most convenient means. In addition, the soybean protein isolate composition can be added to the raw material after distributing the soybean protein isolate composition to water, molasses or oils and fats.

An effective amount of the soybean protein isolate composition for blending is preferably 0.2% by weight or more, more preferably 0.5% by weight or more, most preferably 1.5% by weight or more with respect to powder at the time of preparing dough. When the amount is less than 0.2% by weight, the effect may not be obtained. In addition, as an upper limit for blending is preferably less than 35% by weight, more preferably less than 20% by weight. When 20% by weight or more of the composition is blended, the starch food tends to be a little firm. When 35% by weight or more of the composition is blended, the starch food becomes firm and may have a quite different texture from the original starch food and may be expensive. The phrase "with respect to powder" means a mass ratio to total mass of flour and starch.

EXAMPLES

Hereinafter, Examples are described.

Preparation of a Soybean Protein Isolate Composition

Production Example 1

To defatted soybean was added with 7 times its weight of water and the mixture was adjusted to pH 7 with sodium hydroxide and mixed and extracted, and then, precipitate was removed using a centrifugal machine. To the residue was added with 5 times the defatted soybean weight of water and treated similarly to obtain an extract solution. A pH of the extract solution is adjusted to pH 4.5 with hydrochloric acid to precipitate protein, and the protein was recovered with a centrifugal machine. Water was added to the protein and dispersed the mixture by using a Homomixer, and then, the mixture was spray dried at hot air temperature of 180° C., and exhaust air temperature of 70° C. to obtain soybean protein isolate composition A with powder state.

Preparation of a Soybean Protein Isolate Composition

Comparative Production Example 1

To defatted soybean was added with 7 times its weight of water and the mixture was adjusted to pH 7 with sodium hydroxide and mixed and extracted, and then, precipitate was removed using a centrifugal machine. To the residue was added with 5 times the defatted soybean weight of water and treated similarly to obtain an extract solution. A pH of the extract solution is adjusted to pH 4.5 with hydrochloric acid to precipitate protein, and the protein was recovered with a centrifugal machine. Water was added to the protein and the mixture was neutralized with sodium hydroxide, and then, the mixture was spray dried at hot air temperature of 180° C., and exhaust air temperature of 70° C. to obtain soybean protein isolate composition B with powder state.

Effect of Addition to Noodles

Example 1, 2, Comparative Example 1, 2, Control

An effect of the soybean protein isolate composition A when the composition was used to noodles was confirmed based on comparison with the soybean protein isolate composition B. Noodles were prepared based on the formulation of table 1. Materials were mixed and gathered, and combined and rolled with a noodle making machine (Seto TS-1, manufactured by Sanuki Menki Co., Ltd) to final thickness of 1.0 mm and cut into noodle strip 1 mm wide. The noodles were steamed in a steam cooker at 98° C. for 5 minutes and then hot air dried at 85° C. for 60 minutes. Measurement was carried out 15 minutes after cooling the boiled noodle with water where the noodles were boiled in boiled water for 4 minutes. Measurement was carried out by using Instron universal material testing systems with a wedge-shaped plunger at a rate of 0.05 mm/sec. Taste evaluation was carried out by 6 panelists on a 10-point scale based on the control. Evaluation items are (1) firmness, (2) ease to bite, (3) low degree of slimy feeling after bite, and (4) overall. In the evaluation, 10-point was given to best quality and 0-point was given to worst quality, and 5-point was given to a quality equal with control.

TABLE 1

Formulation of noodles

|  | Control | Example 1 | Comparative Example 1 | Example 2 | Comparative Example 2 |
|---|---|---|---|---|---|
| Semi hard flour | 100 | 98 | 98 | 85 | 85 |
| Soybean protein isolate composition A | — | 2 | — | 15 | — |
| Soybean protein isolate composition B | — | — | 2 | — | 15 |
| Salt | 1.5 | 1.5 | 1.5 | 1.5 | 1.5 |
| Lye water* | 10 | 10 | 10 | 10 | 10 |
| Water | 30 | 30 | 30 | 30 | 30 |

*1.5% $K_2CO_3$, 1.5% $Na_2CO_3$

As shown in table 2, noodles in which soybean protein isolate composition A (Example 1, 2) or B (Comparative Example 1, 2) had higher firmness value than additive-free, and therefore, an effect to give firmness to noodles was confirmed. Addition of 15% by weight (Example 2, Comparative Example 2) showed higher firmness value, that is, higher effect, than addition of 2% by weight (Example 1, Comparative Example 1). When soybean protein isolate composition A and B were compared in same addition amount, firmness values were not different between Example 1 and Comparative Example 1, addition amount of 2% by weight, and between Example 2 and Comparative Example 2, addition amount of 15% by weight, that is, they showed similar firmness. However, when texture was compared, Example 1 showed good ease to bite and lower degree of slimy feeling after bite compared to Comparative Example 1. Similar tendency was shown between Example 2 and Comparative Example 2, but there were more textural differences.

TABLE 2

Result of noodle test

|  | Value of physical property | Sensory evaluation | | | |
|---|---|---|---|---|---|
|  | Firmness (gf) | Firmness | Ease of bite | Texture after bite | Overall |
| Control | 27.6 ± 1.6 | 5 | 5 | 5 | 5 |
| Example 1 | 34.7 ± 3.8 | 7 | 7 | 7 | 7 |
| Comparative Example 1 | 36.7 ± 2.4 | 7 | 6 | 5 | 6 |
| Example 2 | 46.5 ± 2.0 | 10 | 9 | 9 | 9 |
| Comparative Example 2 | 54.2 ± 6.1 | 10 | 8 | 6 | 7 |

Effect of Addition to Baked Confectionery

Example 3, Comparative Example 3, Control

Baked confectioneries according to formulation of table 3 were prepared. Superfine sugar was dissolved in half weight of water by heating. Salt was added so that Example 3, Comparative Example 3 and control had same amount of salt in consideration for amount of salt in the soybean protein isolate composition A or B. Dough was mixed with quart mixer at law speed for 30 minutes while keeping temperature at 35° C., and then kneaded at 36° C. of dough temperature. After leaving at room temperature for 5 to 10 minutes, the dough was sheeted to threefold twice (gauge thickness: 4 mm) with a dough sheeter and shaped to final thickness 2.8 mm×6 mm×90 mm. The dough was baked at 220° C. of upper heater and 210° C. of lower heater for 3 minutes.

After the baking, the baked confectionery was allowed to cool to room temperature, and packed, and leaved one day, and then subjected to taste evaluation and physical property test. The physical property test was carried out by using Instron universal material testing systems. Sample was put on sample table with a hole 2 centimeters in diameter. Sample was pressed with a wedge-shaped plunger at a measurement rate of 6 mm/min until sample was split. The maximum force was assumed to be a breaking force. Taste evaluation was carried out by 5 panelists on a 10-point scale based on the control. Evaluation items are (1) firmness, (2) meltability in the mouth, and (3) overall. In the evaluation, 10-point was given to best quality and 0-point was given to worst quality, and 5-point was given to a quality equal with control.

TABLE 3

Formulation of baked confectionery

|  | Control | Example 3 | Comparative Example 3 |
|---|---|---|---|
| Soft flour | 98 | 93 | 93 |
| Soybean protein isolate composition A | 0 | 5 | 0 |
| Soybean protein isolate composition B | 0 | 0 | 5 |
| Corn starch | 2 | 2 | 2 |
| Skim milk powder | 2 | 2 | 2 |
| Pampas LB | 17 | 17 | 17 |
| Syrup of superfine sugar* | 30 | 30 | 30 |
| Ammonium bicarbonate | 0.8 | 0.8 | 0.8 |
| Sodium bicarbonate | 0.4 | 0.4 | 0.4 |
| Salt | 0.6 | 0.6 | 0.6 |
| High-fructose corn syrup | 5 | 5 | 5 |
| Water (30° C.) | 16 | 20 | 20 |

*Superfine sugar:water = 2:1, dissolved by heating

As a result of the physical property test, as shown in table 4, both Example 3 and Comparative Example 3 showed high breaking force and had firm physical property, compared to control. Similarly, both Example 3 and Comparative Example 3 were evaluated as firmer than control in the taste evaluation. In the point of meltability in the mouth, control became like dumpling with chewing and was not preferable. Example 3 showed good meltability in the mouth and had good texture. Comparative Example 3 showed better meltability in the mouth than control, but was inferior to Example 3. Example 3 showed best texture overall.

TABLE 4

| | Result of baked confectionery test | | |
|---|---|---|---|
| | Physical property test | Taste evaluation | |
| | Breaking force (gf) | Firmness | Meltability in the mouth | Overall |
| Control | 759 | 5 | 5 | 5 |
| Example 3 | 1230 | 9 | 9 | 9 |
| Comparative Example 3 | 1300 | 9 | 7 | 7 |

INDUSTRIAL APPLICABILITY

According to the present invention, a soybean protein composition having an excellent improving effect of processed starch food can be obtained at a low cost.

The invention claimed is:

1. A processed starch food comprising a soybean protein isolate, said soybean protein isolate being obtained by drying in a condition of an acidic precipitate without neutralization, wherein a blending amount of the soybean protein isolate is 0.2% by weight or more as a mass ratio to total mass of flour and starch in the processed starch food.

2. The processed starch food according to claim 1, wherein a blending amount of the soybean protein isolate is 1.5% by weight or more as a mass ratio to total mass of flour and starch in the processed starch food.

3. The processed starch food according to claim 1, which is noodles.

4. The processed starch food according to claim 3, wherein a blending amount of the soybean protein isolate is 1.5% by weight or more as a mass ratio to total mass of flour and starch in the processed starch food.

5. The processed starch food according to claim 1, which is baked confectionery.

6. The processed starch food according to claim 5, wherein a blending amount of the soybean protein isolate is 1.5% by weight or more as a mass ratio to total mass of flour and starch in the processed starch food.

7. A method for improving a physical property of a processed starch food, comprising using a soybean protein isolate as an active ingredient, said soybean protein isolate being obtained by drying in a condition of an acidic precipitate without neutralization, wherein a blending amount of the soybean protein isolate is 0.2% by weight or more as a mass ratio to total mass of flour and starch in the processed starch food.

8. The method according to claim 7, wherein a blending amount of the soybean protein isolate is 1.5% by weight or more as a mass ratio to total mass of flour and starch in the processed starch food.

9. The method according to claim 7, further comprising powdering the soybean protein isolate, and then mixing the soybean protein isolate to raw material of the processed starch food in a powder state.

* * * * *